(12) United States Patent
Pesetsky

(10) Patent No.: US 8,444,384 B2
(45) Date of Patent: May 21, 2013

(54) ROTOR BLADE ASSEMBLY AND METHOD FOR ADJUSTING LOADING CAPABILITY OF ROTOR BLADE

(75) Inventor: David Samuel Pesetsky, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,848

(22) Filed: Aug. 25, 2011

(65) Prior Publication Data

US 2012/0141268 A1 Jun. 7, 2012

(51) Int. Cl.
*B64C 9/00* (2006.01)

(52) U.S. Cl.
USPC .......................... 416/23; 415/914; 244/204.1

(58) Field of Classification Search
USPC .......... 415/914; 416/23, 24, 228, 235, 236 R; 244/200.1, 204, 204.1, 213, 214, 215, 217, 244/198, 199.1, 199.2, 199.3, 201, 206
See application file for complete search history.

(56) References Cited

U.S. PATENT DOCUMENTS

| 2,625,997 | A | * | 1/1953 | Doak | 416/23 |
| 2,852,211 | A | * | 9/1958 | Xenakis | 244/203 |
| 4,692,095 | A | | 9/1987 | Lawson-Tancred | |
| 5,755,408 | A | * | 5/1998 | Schmidt et al. | 244/204 |
| 7,028,954 | B2 | * | 4/2006 | Van Dam et al. | 244/204 |
| 8,038,396 | B2 | * | 10/2011 | Anjuri et al. | 416/1 |
| 2009/0284016 | A1 | | 11/2009 | Van Dam et al. | |
| 2009/0285682 | A1 | | 11/2009 | Baker et al. | |

* cited by examiner

*Primary Examiner* — Edward Look
*Assistant Examiner* — Ryan Ellis
(74) *Attorney, Agent, or Firm* — Dority & Manning, P.A.

(57) ABSTRACT

A rotor blade assembly and a method for adjusting a loading capability of a rotor blade are disclosed. The rotor blade assembly includes a rotor blade having surfaces defining a pressure side, a suction side, a leading edge, and a trailing edge extending between a tip and a root. The rotor blade further defines a span and a chord. The rotor blade assembly further includes a spoiler assembly operable to alter a flow past a surface of the rotor blade. The spoiler assembly is incrementally deployable from the surface along one of a length or a width of the spoiler assembly.

19 Claims, 5 Drawing Sheets

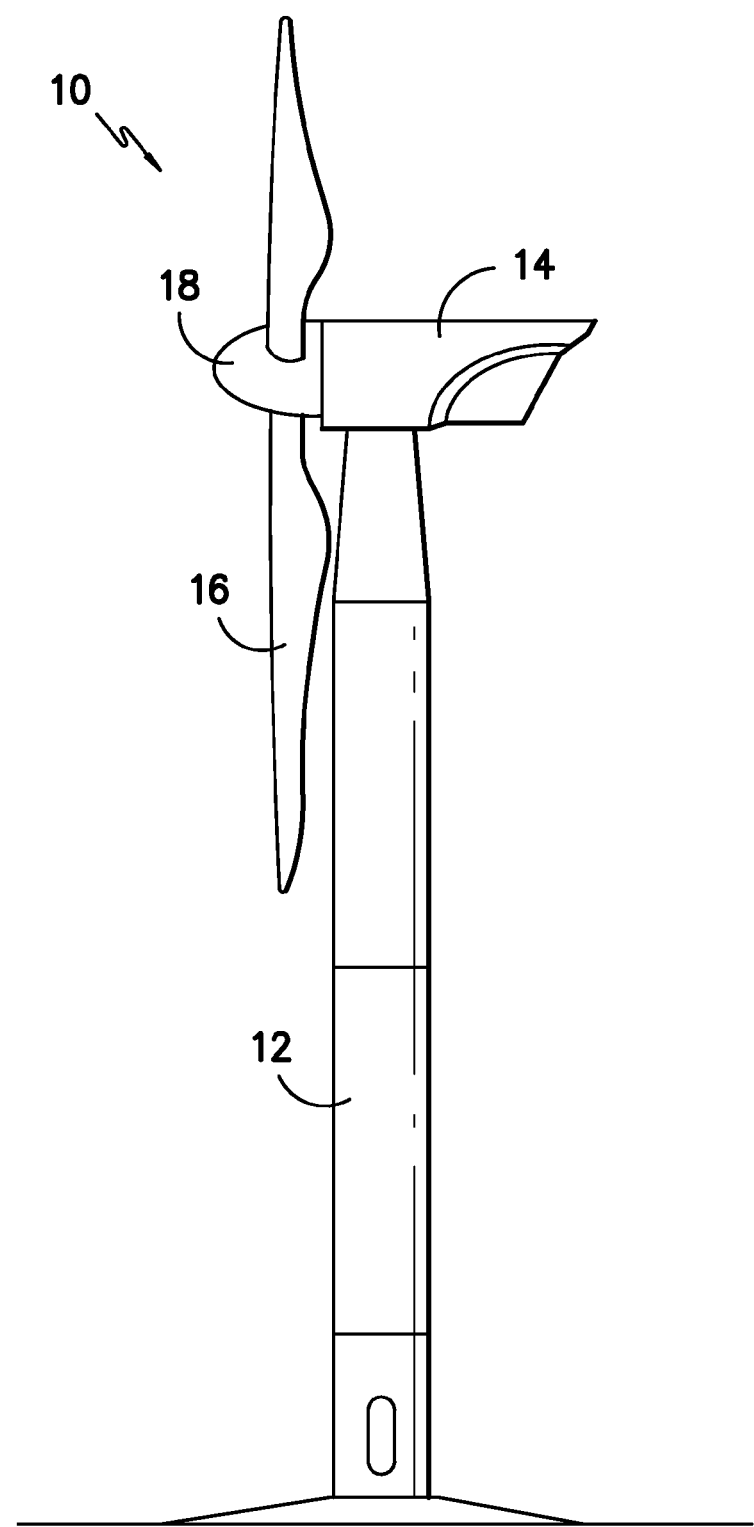
FIG. -1-
PRIOR ART

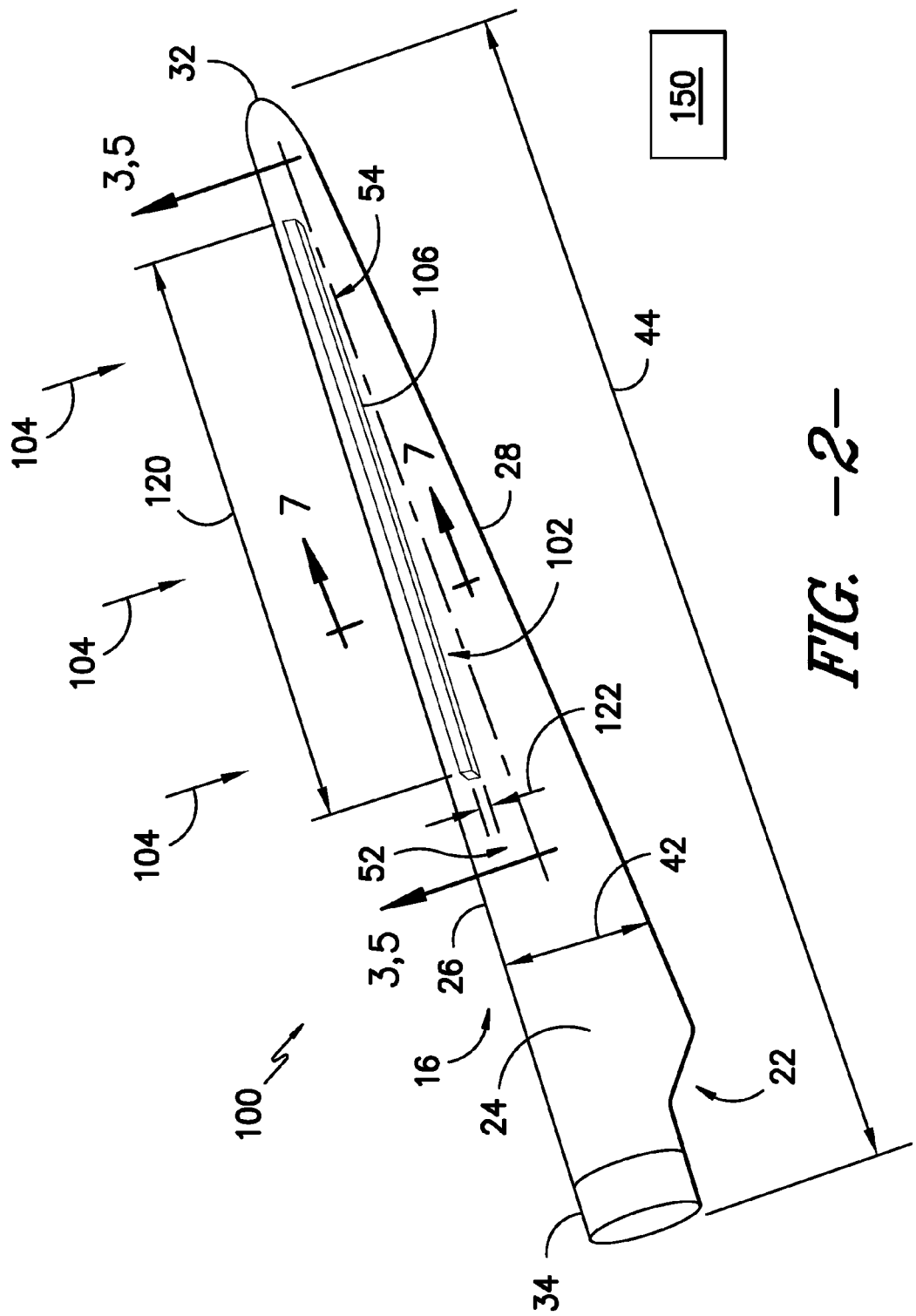
FIG. -2-

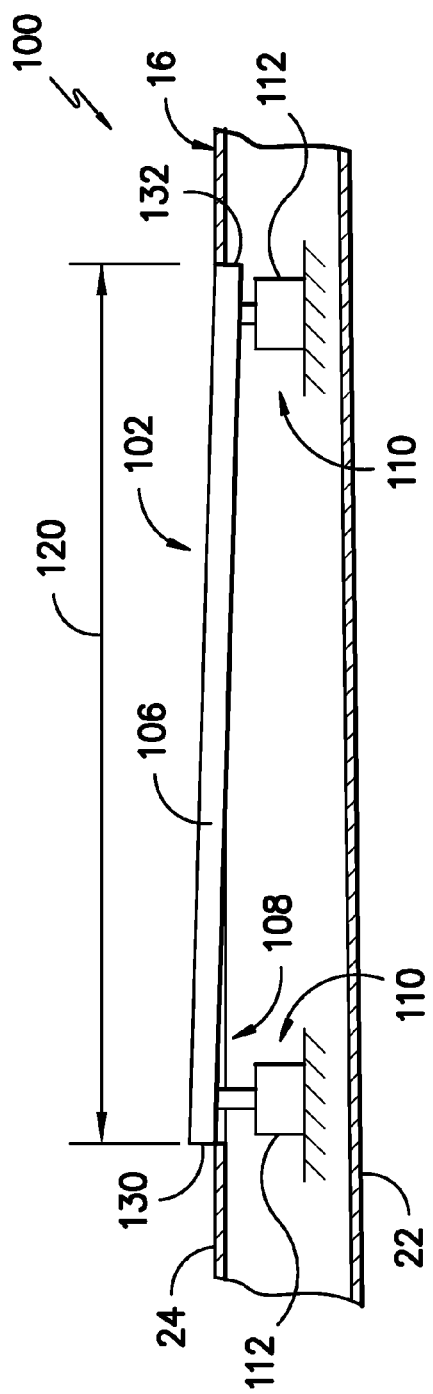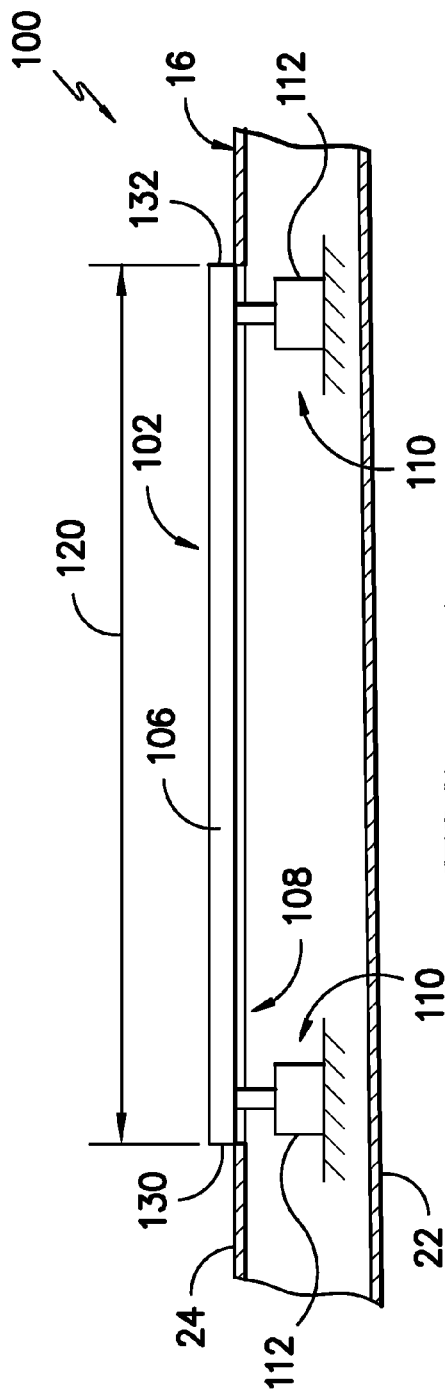

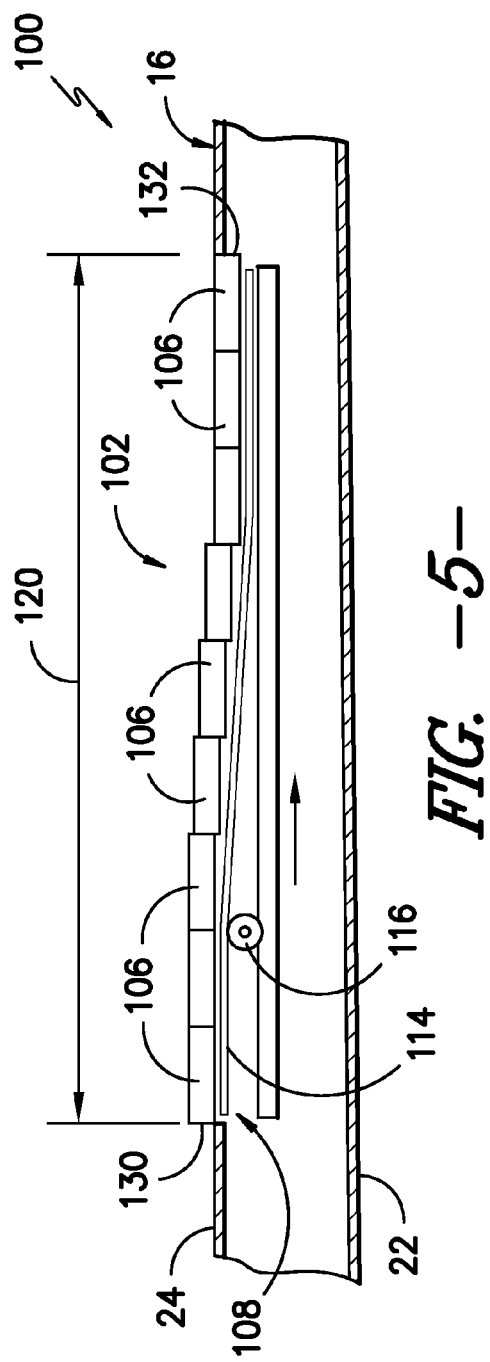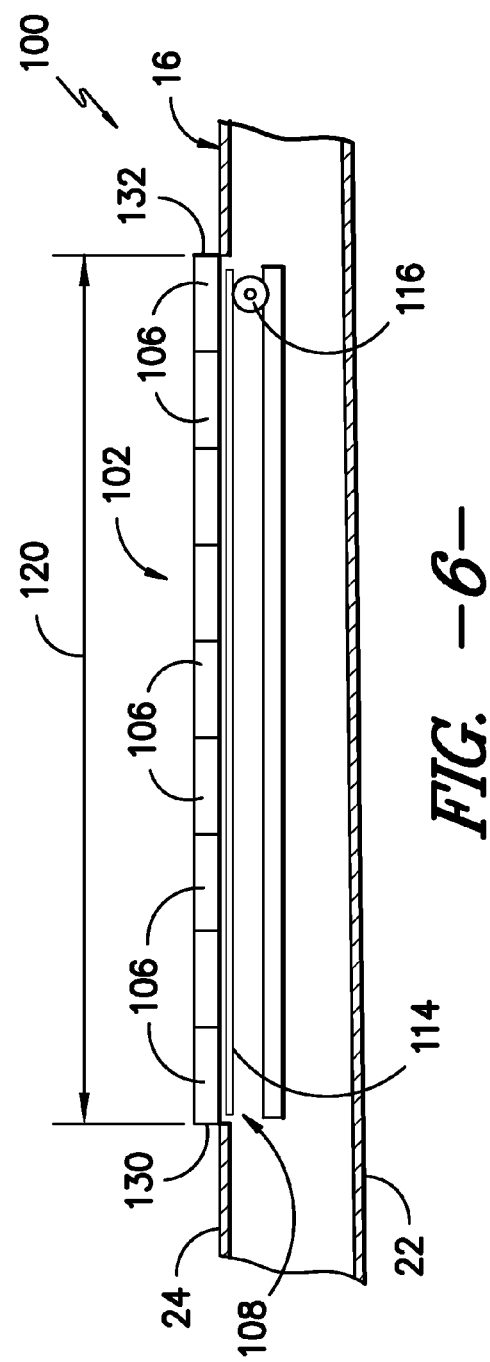

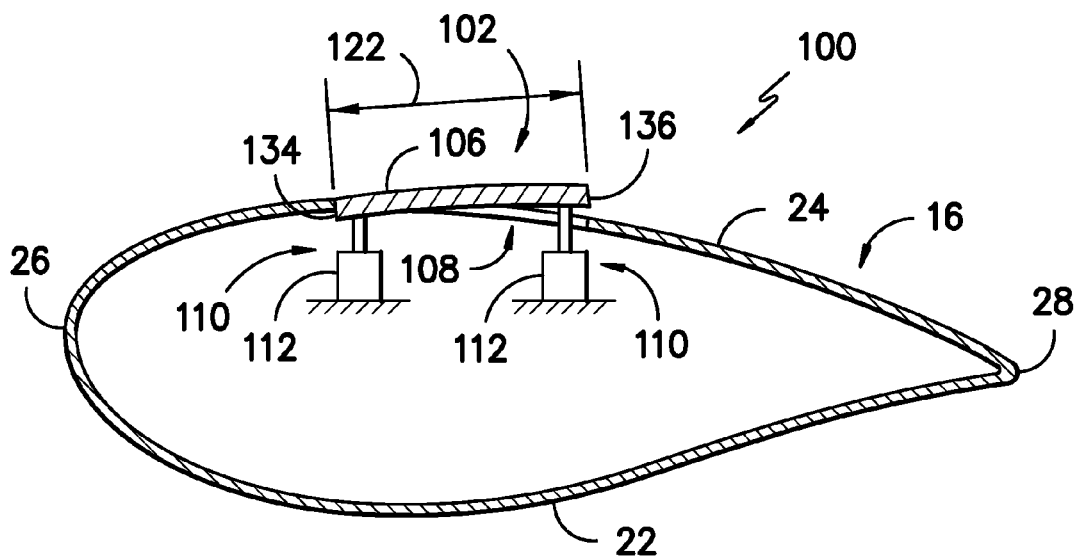
FIG. -7-
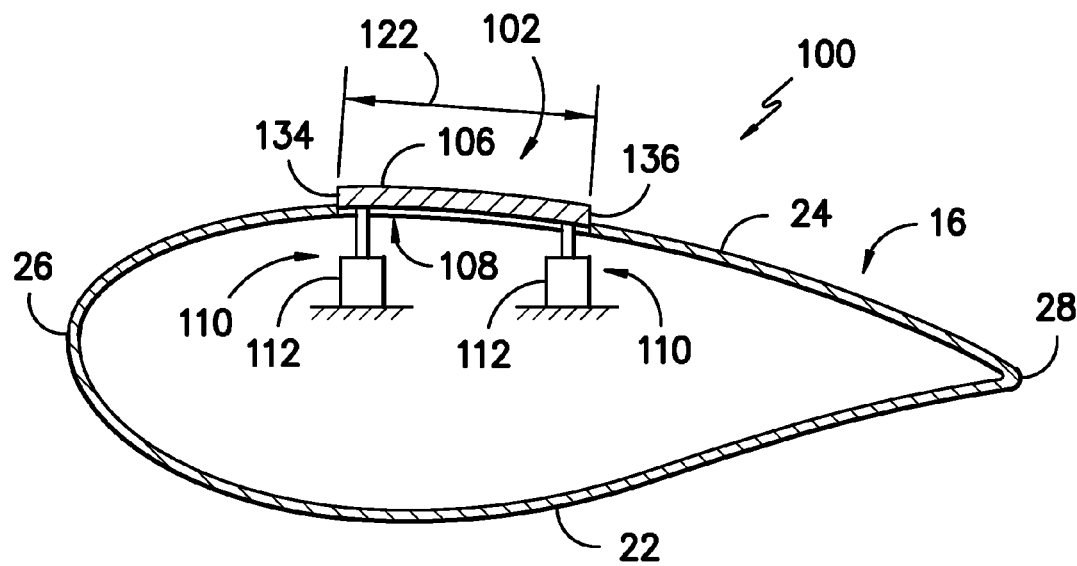
FIG. -8-

ROTOR BLADE ASSEMBLY AND METHOD FOR ADJUSTING LOADING CAPABILITY OF ROTOR BLADE

FIELD OF THE INVENTION

The present disclosure relates in general to rotor blade assemblies, and more particularly to rotor blade assemblies having incrementally deployable spoiler assemblies and methods for adjusting loading capabilities of rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source. However, as rotor blade sizes increase, so do the loads transferred through the blades to other components of the wind turbine (e.g., the wind turbine hub and other components). For example, longer rotor blades result in higher loads due to the increased mass of the blades as well as the increased aerodynamic loads acting along the span of the blade. Such increased loads can be particularly problematic in high-speed wind conditions, as the loads transferred through the rotor blades may exceed the load-bearing capabilities of other wind turbine components.

Certain features, such as spoilers, are known that may be utilized to alter the flow of air from the outer surface of a rotor blade, thereby reducing the lift generated by the blade and reducing the loads acting on the blade, and thus further reducing undesirable deflection of the rotor blade. However, these features are typically designed to be permanently disposed along the outer surface of the rotor blade. As such, the amount of lift generated by the rotor blade is reduced regardless of the conditions in which the wind turbine is operating. Further, in cases where such features are movable, the features are typically only designed to move between a fully non-deployed position and a fully deployed position. Thus, no consideration is given to changing conditions wherein partial deployment of a feature would be beneficial.

Accordingly, an improved rotor blade assembly and method for adjusting loading capability would be desired in the art. For example, a rotor blade assembly including a spoiler assembly that is incrementally deployable would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade having surfaces defining a pressure side, a suction side, a leading edge, and a trailing edge extending between a tip and a root. The rotor blade further defines a span and a chord. The rotor blade assembly further includes a spoiler assembly operable to alter a flow past a surface of the rotor blade. The spoiler assembly is incrementally deployable from the surface along one of a length or a width of the spoiler assembly.

In another embodiment, a method for adjusting a loading capability of a rotor blade is disclosed. The method includes monitoring the loading capability of the rotor blade. The rotor blade has surfaces defining a pressure side, a suction side, a leading edge, and a trailing edge extending between a tip and a root. The rotor blade further includes a span and a chord. The method further includes the step of, when the loading capability reaches a predetermined loading capability limit, operating a spoiler assembly such that the spoiler assembly incrementally deploys from a surface of the rotor blade along one of a length or a width of the spoiler assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a known wind turbine according to one embodiment of the present disclosure;

FIG. 2 is a top view of a rotor blade assembly according to one embodiment of the present disclosure;

FIG. 3 is a cross-sectional view, along the lines 3-3 of FIG. 2, of a rotor blade assembly including a spoiler assembly in a partially deployed position according to one embodiment of the present disclosure;

FIG. 4 is a cross-sectional view of the rotor blade assembly of FIG. 3 including a spoiler assembly in a fully deployed position according to one embodiment of the present disclosure;

FIG. 5 is a cross-sectional view, along the lines 5-5 of FIG. 2, of a rotor blade assembly including a spoiler assembly in a partially deployed position according to one embodiment of the present disclosure;

FIG. 6 is a cross-sectional view of the rotor blade assembly of FIG. 5 including a spoiler assembly in a fully deployed position according to one embodiment of the present disclosure;

FIG. 7 is a cross-sectional view, along the lines 7-7 of FIG. 2, of a rotor blade assembly including a spoiler assembly in a partially deployed position according to one embodiment of the present disclosure; and, FIG. 8 is a cross-sectional view of the rotor blade assembly of FIG. 7 including a spoiler assembly in a fully deployed position according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 (see FIGS. 3 through 5) extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 8, the present disclosure may further be directed to a rotor blade assembly 100. The rotor blade assembly 100 may one or more spoiler assemblies 102 and the rotor blade 16. In general, a spoiler assembly 102 according to the present disclosure may be operable to alter a flow 104, such as a wind flow, past a surface or surfaces of the rotor blade 16. For example, a spoiler assembly 102 may alter flow 104 past any one or more of the pressure side 22, suction side 24, leading edge 26, or trailing edge 28. To alter flow 24, the spoiler assembly 102 may be fully or partially deployed, as discussed below, from a surface of the rotor blade 16. Such deployment may separate the flow 104 from such surface or otherwise interrupt the flow 104, thus altering the flow 104 past such surface.

Alteration of the flow 104 past a surface as discussed above may adjust a loading capability of the rotor blade 16. In other words, alteration of the flow 104 may alter the lift generated by the blade 16, alter the loads acting on the blade 16, and alter the deflection of the blade 16. Typically, alteration of the flow 104 reduces the loading capability, although in some cases such alteration may increase the loading capability.

In exemplary embodiments, a spoiler assembly 102 may be positioned adjacent the leading edge 26 of the rotor blade 16. Alternatively, the spoiler assembly 102 may be positioned adjacent the trailing edge 28 or in any other suitable position relative to any other suitable surface of the rotor blade 16.

Further, in exemplary embodiments, a spoiler assembly 102 may be deployable from the suction side 24. Alternatively, the spoiler assembly 102 may be deployable from the pressure side 28, or from any other suitable surface of the rotor blade 16.

A spoiler assembly 102 according to the present disclosure may include one or more spoilers 106 and one or more actuators 110. Each spoiler 106 may generally have any suitable shape and/or configuration that provides for alteration of the flow 104 past a surface of the rotor blade 16 when fully or partially deployed. For example, a spoiler 106 may be a generally flat plate, a generally cube-like structure, or have a triangular shape, a curved shape (e.g., a semi-elliptical or semi-circular shape), an "L" shape, or any other suitable shape.

In some embodiments, as shown, the spoilers 106 of a spoiler assembly 102, when in a non-deployed position, may lay generally flush with a surface of the rotor blade 16. In other embodiments, as shown, the spoilers 106, when in the non-deployed position, may be disposed generally internally and thus below a surface of the rotor blade 16. In these embodiments, the spoilers 106 may protrude through an opening 108 defined in a surface of the rotor blade 16 when fully or partially deployed. Further, in some embodiments, all of the spoilers 106 of a spoiler assembly 102 according to the present disclosure may protrude through a single opening 108 defined in a surface of the rotor blade 16.

Each actuator 110 may be connected to a spoiler 106, and may fully or partially deploy the spoiler 106 when actuated. For example, an actuator 110 may be a cylinder 112, such as a pneumatic or hydraulic cylinder, or may include a movable track 114 and roller 116, as discussed below, or may be a gear assembly or any other suitable actuation device or assembly.

A spoiler assembly 102 according to the present disclosure is further advantageously incrementally deployable. Such incremental deployment allows various portions of the spoiler assembly 102 to deploy before others portions, thus resulting in partial deployment of the spoiler assembly 102. The remaining portions of the spoiler assembly 102 can then be incrementally deployed, as desired or required, until the spoiler assembly is fully deployed. Incremental deployment allows for initial minimal adjustment of the loading capability of the rotor blade 16 as desired or required. Thus, necessary adjustments may be made without the need to fully deploy the spoiler assembly 102. Only minimal adjustments in, for example, lift capability, result from these minimal adjustments, thus advantageously allowing the rotor blade 16 and wind turbine 10 in general to continually operate at as near to full loading capability as possible even when such adjustments are necessary.

In some embodiments a spoiler assembly 102 according to the present disclosure may be incrementally deployable along a length 120 of the spoiler assembly 102 as shown in FIGS. 3 through 6. In other embodiments a spoiler assembly 102 according to the present disclosure may be incrementally deployable along a width 122 of the spoiler assembly 102 as shown in FIGS. 7 and 8.

Further, in some embodiments, the spoiler assembly 102 may be incrementally deployable along the span 44 of the rotor blade 16, as shown in FIGS. 3 through 6. Thus, for example, the length 120 or width 122 may be aligned along the span 44, such that incremental deployment along the length 120 or width 122 is also in the span-wise direction. In other embodiments, the spoiler assembly 102 may be incrementally deployable along the chord 42 of the rotor blade 16, as shown in FIGS. 7 and 8. Thus, for example, the length 120 or width 122 may be aligned along the chord 42, such that incremental deployment along the length 120 or width 122 is also in the chord-wise direction.

In other embodiments, the spoiler assembly 102 may be incrementally deployable in any suitable direction along which the length 120 or the width 122 is aligned. For example, the length 120 and width 122 need not be aligned with the chord 42 and span 44, and rather may be aligned at any suitable angle to the chord 42 and/or span 44. Further, it should be understood that the spoiler assembly 102 need not be incrementally deployable in a linear fashion. Rather, the spoiler assembly 102 may follow a curvilinear path or any other suitable path, as desired or required.

A spoiler assembly 102 according to the present disclosure may be incrementally deployable from, for example, a first end to a second end, from a middle position outwardly, or from any suitable position along the spoiler assembly 102 to any other suitable position along the spoiler assembly 102. For example, a spoiler assembly 102 may include an inboard end 130 and an outboard end 132, as shown in FIGS. 3 through 6. The spoiler assembly 102 may be incrementally deployable from the inboard end 130 to the outboard end 132. Thus, during deployment of the spoiler assembly 102, the inboard end 130 initially protrudes, and protrusion of the spoiler assembly 102 then continues towards the outboard end 132 until the outboard end 132 protrudes and the spoiler assembly 102 is fully deployed. Alternatively, the spoiler assembly 102 may be incrementally deployable from the outboard end 132 towards the inboard end 130, from another suitable position towards the inboard end 130 and the outboard end 132, or in any other suitable incremental manner.

In other embodiments, a spoiler assembly 102 may include a forward end 134 and an aft end 136, as shown in FIGS. 7 and 8. The spoiler assembly 102 may be incrementally deployable from the forward end 134 to the aft end 136. Thus, during deployment of the spoiler assembly 102, the forward end 134 initially protrudes, and protrusion of the spoiler assembly 102 then continues towards the aft end 136 until the aft end 136 protrudes and the spoiler assembly 102 is fully deployed. Alternatively, the spoiler assembly 102 may be incrementally deployable from the aft end 136 towards the forward end 134, from another suitable position towards the forward end 134 and/or the aft end 136, or in any other suitable incremental manner.

In some embodiments, a rotor blade assembly 100 according to the present disclosure may further include a controller 150. The controller 150 may be in operable communication with a spoiler assembly 102, such as with the spoilers 106, actuators 110, or other components thereof, and may thus be operable to operate the spoiler assembly 102, as discussed. Thus, the spoiler assembly 102 may be communicatively coupled to the controller 150. Such communicative coupling may be through a physical coupling, such as through a wire or other conduit or umbilical cord, or may be a wireless coupling, such as through an infra-red, cellular, sonic, optical, or radio frequency based coupling. The controller 150 may be incorporated into a suitable control system (not shown), such as a handheld remote, a personal digital assistant, cellular telephone, a separate pendant controller, or a computer. A spoiler assembly 102 may be operated manually through the controller 150 by a human operator, or may be partially or fully automated through the use of suitable programming logic incorporated into the controller 150.

In some embodiments, the controller 150 may be configured to operate the spoiler assembly 102 according to a constant feedback loop. Thus, the controller 150 may include suitable software and/or hardware for constantly monitoring and interpreting the loading capability of a rotor blade 16 in real-time, and for operating the spoiler assembly 102 as required in order for such loading capability to be maintained within a predetermined window or above or below a predetermined minimum or maximum amount. For example, the controller may monitor and interpret the deflection of the rotor blade 16, the lift generated by the rotor blade 16, the loading experienced by the rotor blade 16, or any other suitable characteristic of the loading capability of the rotor blade 16. The controller 150, loop, and software and/or hardware may further be communicatively coupled to suitable sensors (not shown) mounted to the rotor blade 16. The sensors may measure and report such loading capability.

FIGS. 3 and 4 illustrate one embodiment of a rotor blade assembly 100 according to the present disclosure. The spoiler assembly 102 according to this embodiment includes a single spoiler 106 and a plurality of actuators 110, which in this embodiment are cylinders 112. One actuator 110 is positioned adjacent an inboard end 130, while another is positioned adjacent an outboard end 132. During operation of the spoiler assembly 102, the inboard end 130 is first fully deployed through actuation of the adjacent actuator 110, as shown in FIG. 3. Incremental deployment of the spoiler assembly 102 then continues through gradual actuation of the actuator 110 adjacent to the outboard end 132 as desired, such that the spoiler assembly 102 is incrementally deployed along the length 120 of the spoiler assembly and span 44 of the rotor blade 16. Such incremental deployment may continue until both the inboard end 130 and outboard end 132 are both fully deployed, as shown in FIG. 4.

FIGS. 5 and 6 illustrate another embodiment of a rotor blade assembly 100 according to the present disclosure. The spoiler assembly 102 according to this embodiment includes a plurality of spoilers 106 and an actuator 110, which in this embodiment includes a movable track 114 and a roller 116. During operation of the spoiler assembly 102, the spoilers 106 that comprise the spoiler assembly 102 are incrementally deployed, beginning with the spoiler 106 that included the inboard end 130, as shown in FIG. 5. Such deployment occurs through actuation of the actuator, which in this case includes rolling of the roller 116 along the movable track 114 to cause the movable track 114 to move, contacting and deploying each of the spoilers 102 in incremental fashion. Incremental deployment of the spoiler assembly 102 then continues with gradual deployment of the spoilers 106 towards the spoiler 106 that includes the outboard end 132, such that the spoiler assembly 102 is incrementally deployed along the length 120 of the spoiler assembly and span 44 of the rotor blade 16. Such incremental deployment may continue until both the inboard end 130 and outboard end 132 are both fully deployed, as shown in FIG. 6.

FIGS. 7 and 8 illustrate another embodiment of a rotor blade assembly 100 according to the present disclosure. The spoiler assembly 102 according to this embodiment includes a single spoiler 102 and a plurality of actuators 110, which in this embodiment are cylinders 112. One actuator 110 is positioned adjacent a forward end 134, while another is positioned adjacent an aft end 136. During operation of the spoiler assembly 102, the aft end 136 is first fully deployed through actuation of the adjacent actuator 110, as shown in FIG. 7. Incremental deployment of the spoiler assembly 102 then continues through gradual actuation of the actuator 110 adjacent to the forward end 134 as desired, such that the spoiler assembly 102 is incrementally deployed along the width 122 of the spoiler assembly and chord 42 of the rotor blade 16. Such incremental deployment may continue until both the forward end 134 and aft end 136 are both fully deployed, as shown in FIG. 8.

It should be understood that a spoiler assembly according to the present disclosure may be retracted, from a fully or partially deployed position to a non-deployed position, in the same incremental fashion through which the spoiler was deployed.

The present disclosure is further directed to a method for adjusting a loading capability of a rotor blade 16. The loading capability may be determined via lift capability, loading capability, deflection capability, or any other suitable characteristic for the rotor blade 16. The method includes, for example, monitoring the loading capability of the rotor blade 16, as discussed above. The method further includes the step of, when the loading capability exceeds a predetermined loading capability limit, such as a lift, load, or deflection limit, operating a spoiler assembly 102. The predetermined loading capability limit may in some embodiments be a maximum limit. The spoiler assembly 102 may be operated such that the spoiler assembly 102 incrementally deploys from a surface of the rotor blade 16, as discussed above. Such incremental deployment may continue until the loading capability is below or out of range of the predetermined loading capability limit, or until full deployment of the spoiler assembly 102 is reached.

In some embodiments, the operating step includes operating a controller 150. The controller 150 is in operable communication with the spoiler assembly 102, and may operate the spoiler assembly 102 to incrementally deploy the spoiler assembly 102 as desired or required, such as until the loading capability is below or out of range of the predetermined loading capability limit, or until full deployment of the spoiler assembly 102 is reached.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
   a rotor blade having surfaces defining a pressure side, a suction side, a leading edge, and a trailing edge extending between a tip and a root, the rotor blade further defining a span and a chord; and,
   a spoiler assembly operable to alter a flow past a surface of the rotor blade, the spoiler assembly comprising a spoiler and a plurality of actuators connected to the spoiler, the spoiler incrementally deployable from the surface along one of a length or a width of the spoiler assembly.

2. The rotor blade assembly of claim 1, wherein the spoiler is incrementally deployable along the span.

3. The rotor blade assembly of claim 2, wherein the spoiler is incrementally deployable from an inboard end to an outboard end.

4. The rotor blade assembly of claim 1, further comprising a controller in operable communication with the spoiler assembly.

5. The rotor blade assembly of claim 1, wherein the spoiler assembly is positioned adjacent the leading edge.

6. The rotor blade assembly of claim 1, wherein the spoiler assembly is deployable from the suction side.

7. The rotor blade assembly of claim 1, wherein the spoiler is incrementally deployable along the chord.

8. A wind turbine, comprising:
   a plurality of rotor blades each having surfaces defining a pressure side, a suction side, a leading edge, and a trailing edge extending between a tip and a root, each of the plurality of rotor blades further defining a span and a chord; and,
   a spoiler assembly operable to alter a flow past a surface of one of the plurality of rotor blades, the spoiler assembly comprising a spoiler and a plurality of actuators connected to the spoiler, the spoiler incrementally deployable from the surface along one of a length or a width of the spoiler assembly.

9. The wind turbine of claim 8, wherein the spoiler is incrementally deployable along the span.

10. The wind turbine of claim 9, wherein the spoiler is incrementally deployable from an inboard end to an outboard end.

11. The wind turbine of claim 8, further comprising a controller in operable communication with the spoiler assembly.

12. The wind turbine of claim 8, wherein the spoiler is incrementally deployable along the chord.

13. A rotor blade assembly, comprising:
   a rotor blade having surfaces defining a pressure side, a suction side, a leading edge, and a trailing edge extending between a tip and a root, the rotor blade further defining a span and a chord; and,
   a spoiler assembly operable to alter a flow past a surface of the rotor blade, the spoiler assembly comprising a plurality of spoilers and an actuator connected to the plurality of spoilers, the actuator comprising a movable track and a roller, wherein movement of the roller along the movable track causes incremental deployment of the spoiler assembly from the surface along one of a length or a width of the spoiler assembly.

14. The rotor blade assembly of claim 13, wherein the spoiler is incrementally deployable along the span.

15. The rotor blade assembly of claim 13, wherein the spoiler is incrementally deployable from an inboard end to an outboard end.

16. The rotor blade assembly of claim 13, further comprising a controller in operable communication with the spoiler assembly.

17. The rotor blade assembly of claim 13, wherein the spoiler assembly is positioned adjacent the leading edge.

18. The rotor blade assembly of claim 13, wherein the spoiler assembly is deployable from the suction side.

19. The rotor blade assembly of claim 13, wherein the spoiler assembly is incrementally deployable along the chord.

* * * * *